US012108162B2

(12) United States Patent
Dobashi

(10) Patent No.: US 12,108,162 B2
(45) Date of Patent: Oct. 1, 2024

(54) IMAGING CONTROL APPARATUS FOR CONTROLLING EXPOSURE OF IMAGING APPARATUS BASED ON SUBJECT AUTHENTICATION RESULT, IMAGING CONTROL METHOD, AND STORAGE MEDIUM

(71) Applicant: CANON KABUSHIKI KAISHA, Tokyo (JP)

(72) Inventor: Toshiyuki Dobashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/737,848

(22) Filed: May 5, 2022

(65) Prior Publication Data
US 2022/0360701 A1     Nov. 10, 2022

(30) Foreign Application Priority Data
May 10, 2021   (JP) ................ 2021-079804

(51) Int. Cl.
*H04N 23/73*    (2023.01)
*G06V 40/16*    (2022.01)
*H04N 23/611*   (2023.01)

(52) U.S. Cl.
CPC .......... *H04N 23/73* (2023.01); *G06V 40/161* (2022.01)

(58) Field of Classification Search
None
See application file for complete search history.

(56) References Cited

U.S. PATENT DOCUMENTS

| | | | |
|---|---|---|---|
| 2009/0225189 A1* | 9/2009 | Morin | G03B 7/003 348/222.1 |
| 2013/0250106 A1 | 9/2013 | Chang et al. | |
| 2016/0110589 A1* | 4/2016 | Ozaki | A63F 13/213 382/118 |
| 2022/0191374 A1* | 6/2022 | Kowdle | G06V 10/143 |

FOREIGN PATENT DOCUMENTS

| | | |
|---|---|---|
| JP | 4254873 B2 | 4/2009 |
| WO | 2021/061112 A1 | 4/2021 |

* cited by examiner

*Primary Examiner* — Samuel D Fereja
(74) *Attorney, Agent, or Firm* — Canon U.S.A., Inc. IP Division

(57) ABSTRACT

A control apparatus for controlling an imaging apparatus includes a determination unit configured to determine whether at least one subject in an image captured by the imaging apparatus is an authenticated subject, and a control unit configured to, in a case where the determination unit determines that the at least one subject is not an authenticated subject, control exposure of the image by targeting the at least one subject.

15 Claims, 8 Drawing Sheets

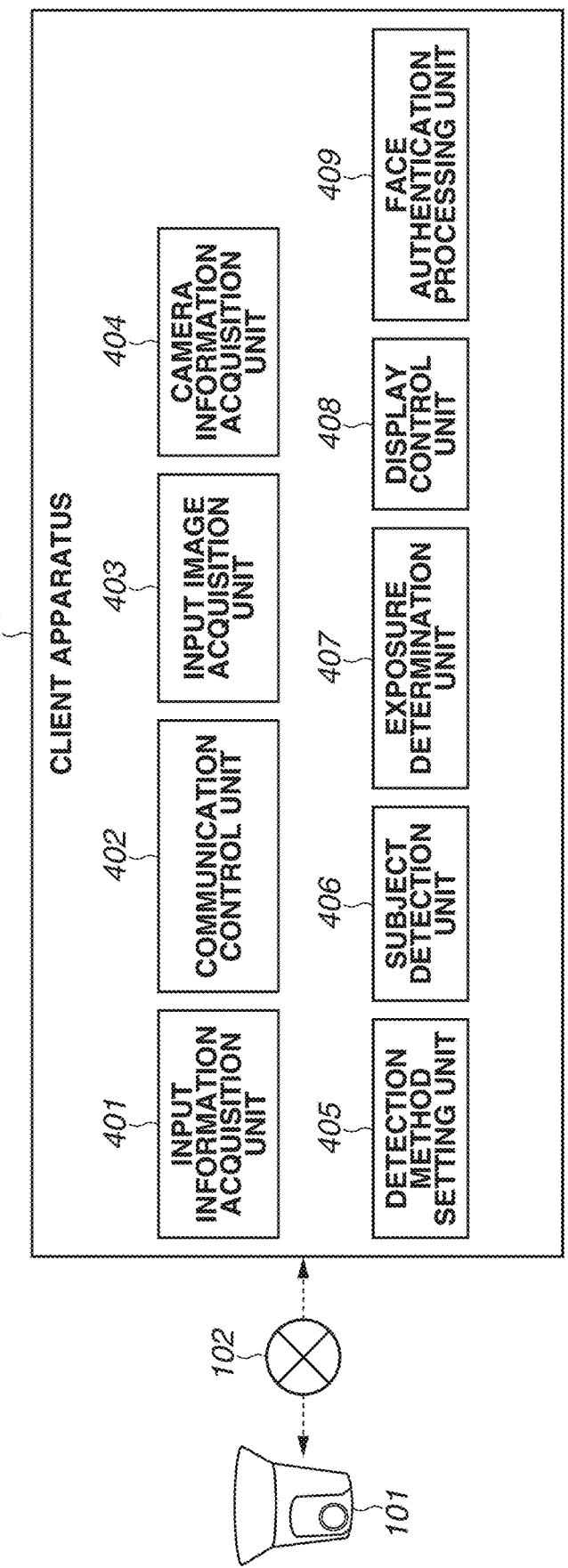

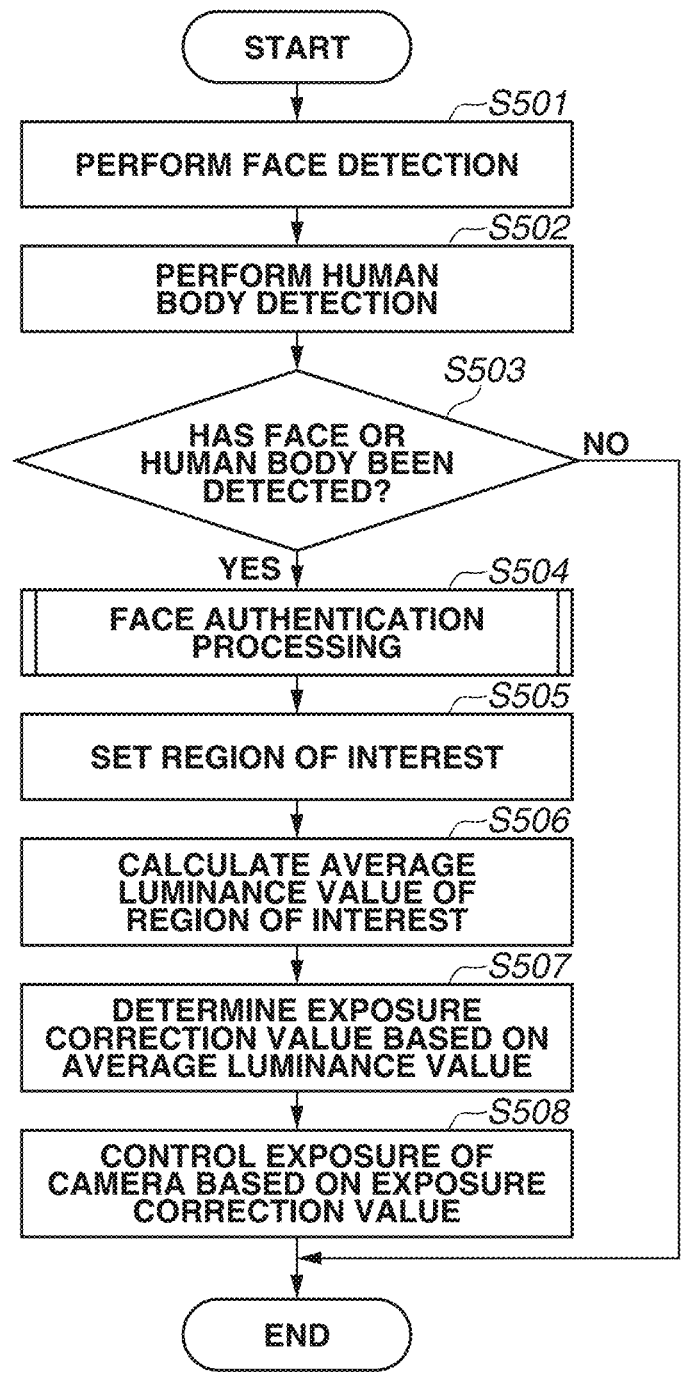

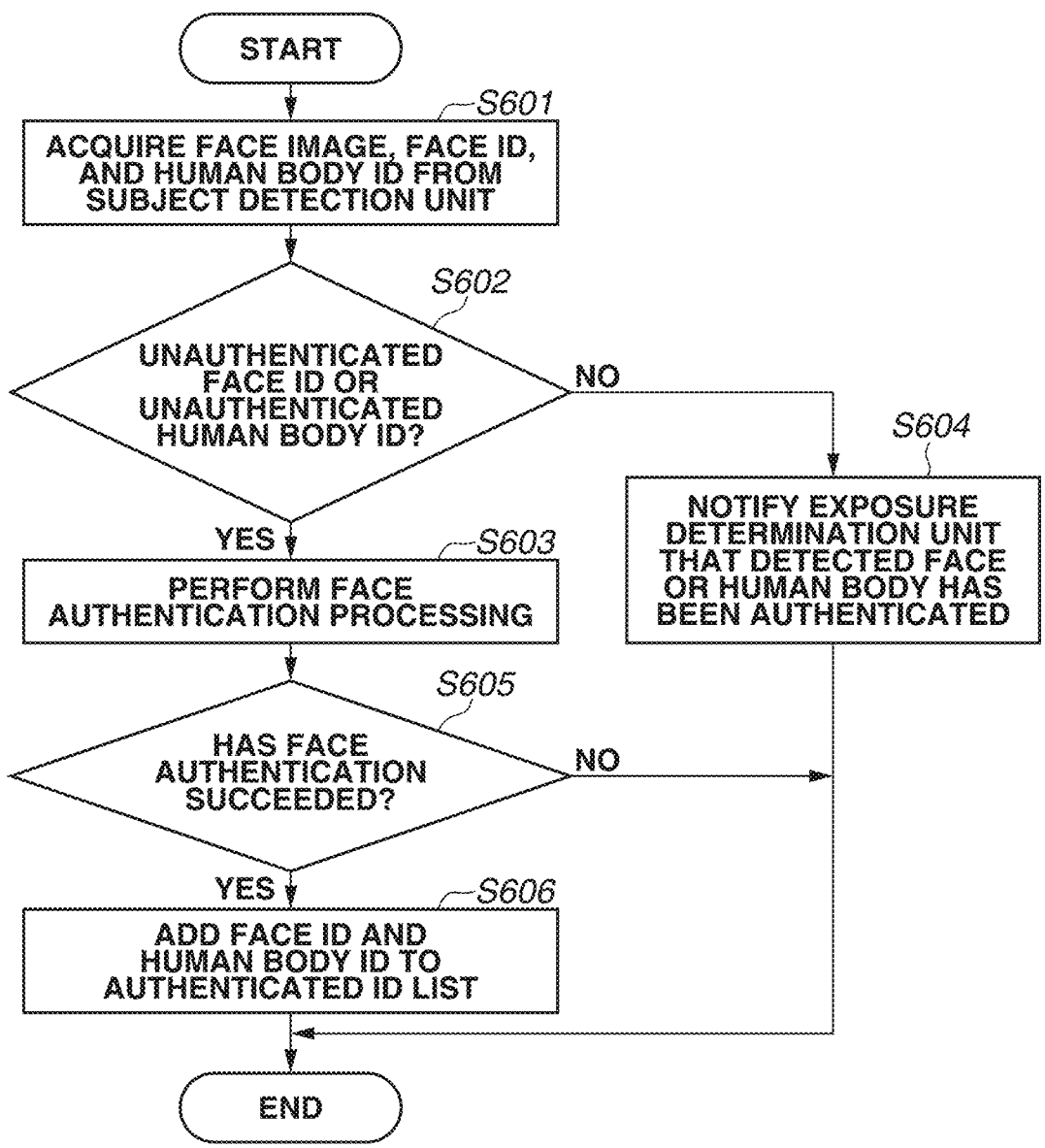

DETECTION EXAMPLE OF FACE REGION

DETECTION EXAMPLE OF HUMAN BODY REGION

IMAGING CONTROL APPARATUS FOR CONTROLLING EXPOSURE OF IMAGING APPARATUS BASED ON SUBJECT AUTHENTICATION RESULT, IMAGING CONTROL METHOD, AND STORAGE MEDIUM

BACKGROUND OF THE DISCLOSURE

Field of the Disclosure

The present disclosure relates to an imaging control apparatus that controls exposure of an imaging apparatus based on a subject authentication result, an imaging control method, and a storage medium.

Description of the Related Art

Japanese Patent No. 4254873 discusses a technique of detecting a face region of a subject from a captured image and then setting an imaging condition and the like based on an importance level of the detected face.

SUMMARY OF THE DISCLOSURE

According to an aspect of the present disclosure, a control apparatus for controlling an imaging apparatus includes a determination unit configured to determine whether at least one subject in an image captured by the imaging apparatus is an authenticated subject, and a control unit configured to, in a case where the determination unit determines that the at least one subject is not an authenticated subject, control exposure of the image by targeting the at least one subject.

Further features of the present disclosure will become apparent from the following description of embodiments with reference to the attached drawings.

BRIEF DESCRIPTION OF THE DRAWINGS

FIG. 4 is a diagram illustrating functions performed by the client apparatus illustrated in FIG. 3.

FIG. 5 is a flowchart illustrating exposure control processing according to the first embodiment.

FIG. 6 is a flowchart illustrating face authentication processing according to the first embodiment.

DESCRIPTION OF THE EMBODIMENTS

Embodiments of the present invention will be described in detail below with reference to the attached drawings. The invention is not limited to the following embodiments, and the combinations of features described in the embodiments are not necessarily essential for carrying out the present invention. Configurations according to the embodiments can be appropriately modified or changed based on a specification of an apparatus to which any of the embodiments is applied, and various conditions (e.g., use condition, use environment). The technical scope of the present invention is defined by claims and is not limited by the individual embodiments. Furthermore, parts of the embodiments can be appropriately combined.

One or more of functional blocks illustrated in FIG. 4 (described below) can be implemented by hardware, such as an application specific integrated circuit (ASIC) or a programmable logic allay (PLA), or can be implemented by a programmable processor, such as a central processing unit (CPU) or a micro-processing unit (MPU), executing software. Furthermore, one or more of the functional blocks illustrated in FIG. 4 can be implemented by a combination of software and hardware. Thus, in the following description, even in a case where different functional blocks are described as operating subjects, the functional blocks can be implemented by the same hardware.

A first embodiment of the present invention will be described with reference to FIG. 1 to FIG. 7B.

<Basic Configuration>

Figure 1:
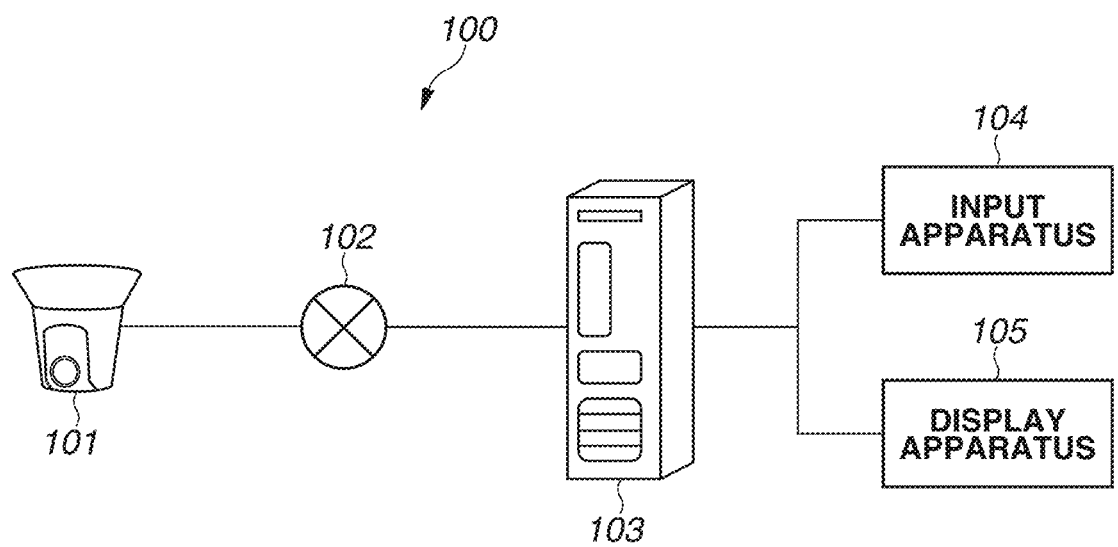
FIG. 1 is a block diagram illustrating a configuration of an imaging control system according to a first embodiment of the present invention.

FIG. 1 illustrates a configuration of an imaging control system 100 according to the present embodiment.

The imaging control system 100 includes a monitoring camera 101, a network 102, a client apparatus 103, an input apparatus 104, and a display apparatus 105. The monitoring camera 101 is an imaging apparatus for acquiring a moving image, and is capable of capturing an age of a subject and performing image processing. Each of the monitoring camera 101, the client apparatus 103, the input apparatus 104, and the display apparatus 105 includes a communication function. The monitoring camera 101 and the client apparatus 103 are communicably connected to each other through the network 102. The client apparatus 103 is communicably connected to the input apparatus 104 and the display apparatus 105. The client apparatus 103 processes various kinds of information, and thus can be referred to as an information processing apparatus. The client apparatus 103 also controls the imaging by the monitoring camera 101 (e.g., controls exposure). Thus, the client apparatus 103 can be referred to as an imaging control apparatus. The subject (or object) is, for example, a person.

The input apparatus 104 includes a mouse and a keyboard, and is operated by a user of the client apparatus 103.

The display apparatus 105 includes a monitor that displays an image received from the client apparatus 103. In addition, the display apparatus 105 can function as a user interface (UI) such as a touch panel. In this case, the display apparatus 105 can also function as an input apparatus used to input an instruction, information, and data to the client apparatus 103.

In FIG. 1, the client apparatus 103, the input apparatus 104, and the display apparatus 105 are illustrated as independent apparatuses, but the present embodiment is not limited to such a configuration. For example, the client apparatus 103 and the display apparatus 105 may be integrated into one apparatus, or the input apparatus 104 and the display apparatus 105 may be integrated into one apparatus. Alternatively, the client apparatus 103, the input apparatus 104, and the display apparatus 105 may be integrated into one apparatus. In a case where the client apparatus 103 and the display apparatus 105 are integrated into one apparatus, the integrated apparatus takes a form of, for example, a personal computer, a tablet terminal, or a smartphone.

<Configuration of Monitoring Camera>

Figure 2:
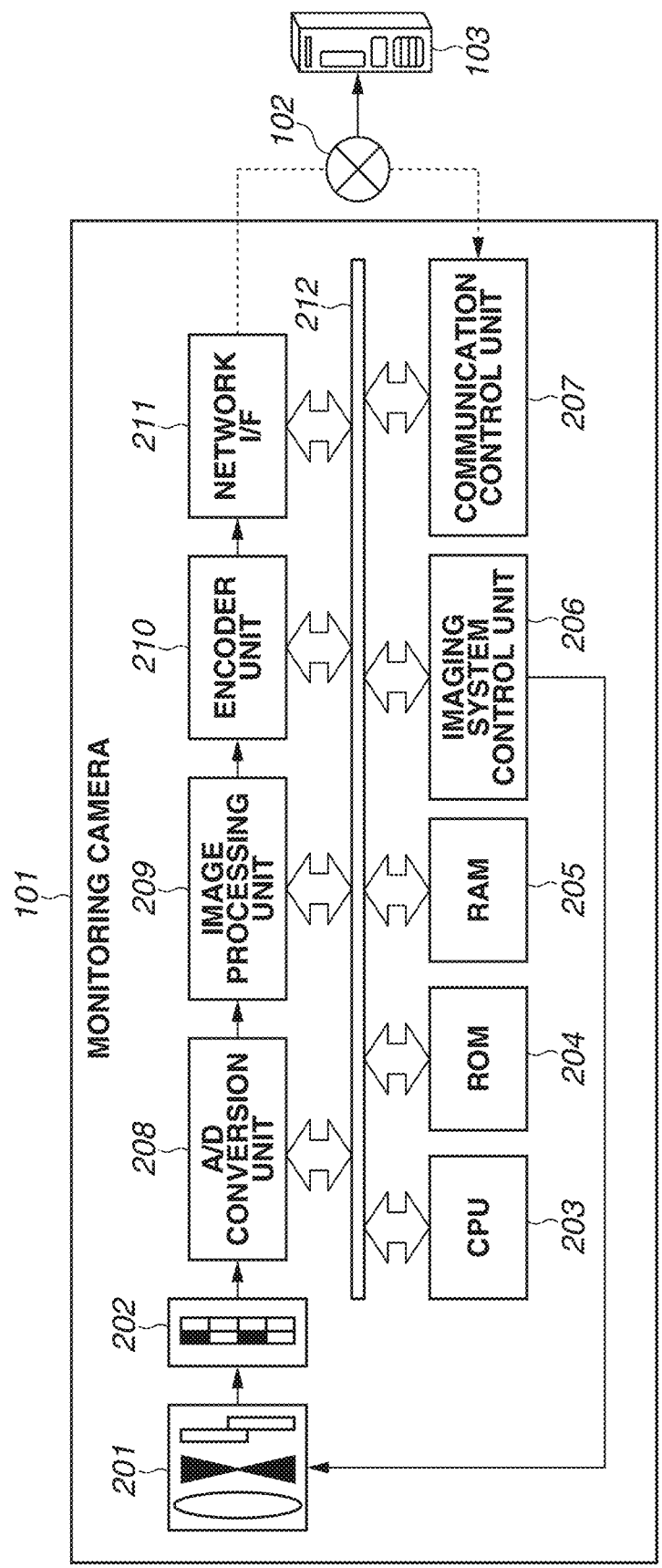
FIG. 2 is a block diagram illustrating an internal configuration of a monitoring camera according to the first embodiment.

FIG. 2 is a block diagram illustrating an internal configuration of the monitoring camera 101. The monitoring camera 101 includes an imaging optical system 201, an image sensor 202, a CPU (or a camera CPU) 203, a read only memory (ROM) 204, a random access memory (RAM) 205, an imaging system control unit 206, a communication control unit 207, an analog-to-digital (A/D) conversion unit 208, an image processing unit 209, an encoder unit 210, and a network interface (I/F) 211. The components 203 to 211 included in the monitoring camera 101 are mutually connected by a system bus 212.

The imaging optical system 201 includes a zoom lens, a focus lens, a blur correction lens, an aperture, and a shutter, and is an optical member group that collects optical information about the subject. The imaging optical system 201 is connected to the image sensor 202.

The image sensor 202 is a charge-storage type solid-state image sensor, such as a complementary metal-oxide semiconductor (CMOS) image sensor or a charge-coupled device (CCD) image sensor, which converts an optical flux collected by the imaging optical system 201 into a current value (a signal value). The image sensor 202 is an imaging unit configured to acquire color information by being combined with a color filter or the like. The image sensor 202 is connected to the A/D conversion unit 208.

The camera CPU 203 is a control unit configured to comprehensively control operations of the monitoring camera 101. The camera CPU 203 reads a command stored in the ROM 204 or the RAM 205 to perform processing based on the reading result.

The imaging system control unit 206 controls the components of the monitoring camera 101 based on an instruction from the camera CPU 203. For example, the imaging system control unit 206 performs control of the imaging optical system 201, such as focus control, shutter control, and aperture adjustment.

The communication control unit 207 performs control to transmit control commands (control signals) issued from the client apparatus 103 to the components of the monitoring camera 101, to the camera CPU 203 through communication with the client apparatus 103.

The A/D conversion unit 208 converts the current value received from the image sensor 202 into a digital signal (image data). The A/D conversion unit 208 transmits the digital signal to the image processing unit 209.

The image processing unit 209 performs image processing on the image data, i.e., the digital signal received from the A/D conversion unit 208. The image processing unit 209 is connected to the encoder unit 210.

The encoder unit 210 performs processing for converting the image data processed by the image processing unit 209 into a file format such as Motion JPEG (M-JPEG), H.264, or H.265. The encoder unit 210 is connected to the network I/F 211.

The network I/F 211 is used to communicate with an external apparatus such as the client apparatus 103 through the network 102, and is controlled by the communication control unit 207.

The network 102 is an internet protocol (IP) network that connects the monitoring camera 101 and the client apparatus 103. The network 102 includes a plurality of routers, switches, and cables complying with a communication standard such as Ethernet®. In the present embodiment, the communication standard, the scale, and the configuration of the network 102 are not particularly limited as long as the network 102 enables communication between the monitoring camera 101 and the client apparatus 103. For example, the network 102 may be the Internet, a wired local area network (LAN), a wireless LAN (WLAN), or a wide area network (WAN).

<Configuration of Client Apparatus>

Figure 3:
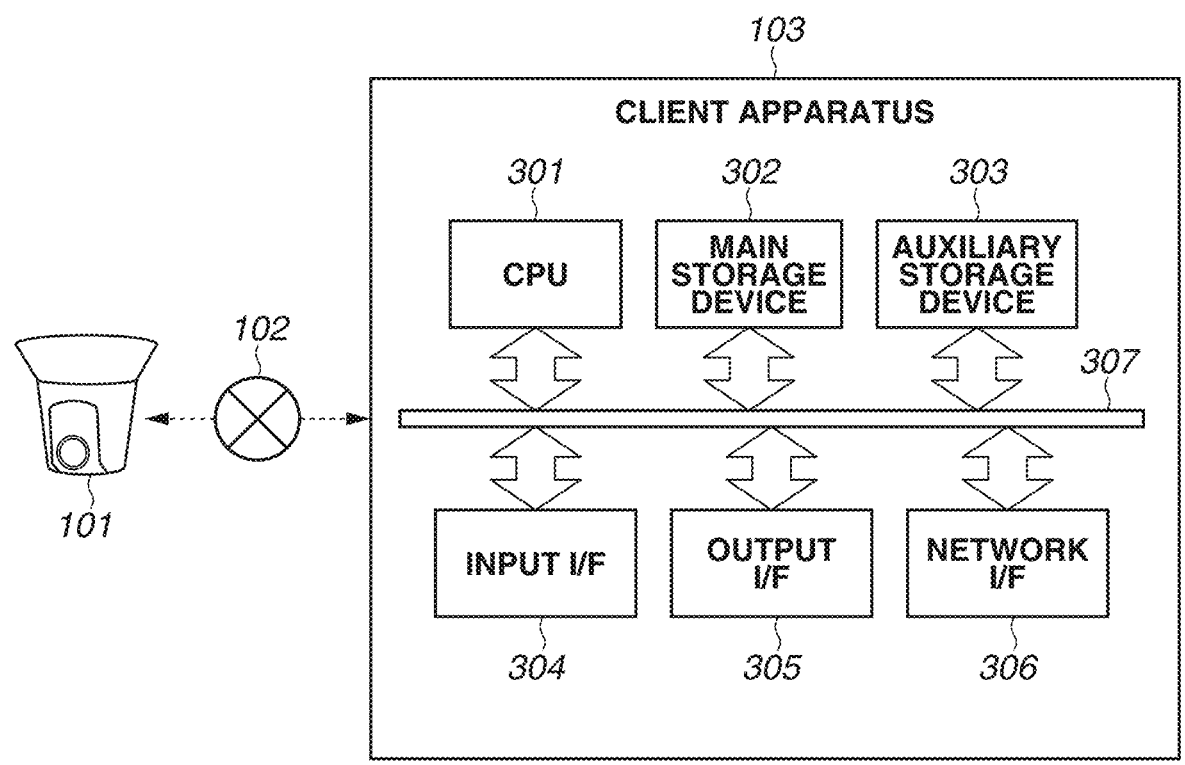
FIG. 3 is a block diagram illustrating an internal configuration of a client apparatus according to the first embodiment.

FIG. 3 is a block diagram illustrating an internal configuration of the client apparatus 103.

The client apparatus 103 includes a CPU (or a client CPU) 301, a main storage device 302, an auxiliary storage device 303, an input I/F 304, an output I/F 305, and a network I/F 306. The components of the client apparatus 103 are communicably connected to each other through a system bus 307.

The client CPU 301 comprehensively controls operations of the client apparatus 103. The client CPU 301 may comprehensively control the monitoring camera 101 through the network 102.

The main storage device 302 functions as a temporary data storage area of the client CPU 301, such as a RAM. For example, the main storage device 302 stores, in advance, patterns for pattern matching (patterns corresponding to face characteristic portions and human body characteristic portions) to be used when the client apparatus 103 performs face detection or human body detection.

The auxiliary storage device 303 is for example a hard disk drive (HDD), a ROM, or a solid state drive (SSD), and stores various kinds of programs and various kinds of setting data. The auxiliary storage device 303 stores an authenticated identification (ID) list that holds past authentication history information. The auxiliary storage device 303 also stores a database (a face authentication database) in which preregistered face images and person information are associated with each other.

The input I/F 304 is used when the client apparatus 103 receives an input (a signal) from the input apparatus 104 or the like.

The output I/F 305 is used when the client apparatus 103 outputs information (a signal) to the display apparatus 105 or the like.

The network I/F 306 is used to communicate with an external apparatus such as the monitoring camera 101 through the network 102.

Functions and processing of the client apparatus 103 illustrated in FIG. 4 are implemented by the client CPU 301 performing processing based on the programs stored in the auxiliary storage device 303. The details thereof will be described with reference to FIG. 4.

<Functions of Client Apparatus>

FIG. 4 illustrates the functions performed by the client apparatus 103. In other words, components (functional blocks) illustrated in FIG. 4 can be performed by the client CPU 301, and the components are synonymous with the client CPU 301.

As illustrated in FIG. 4, the client CPU 301 of the client apparatus 103 includes an input information acquisition unit (an input signal acquisition unit) 401, a communication control unit 402, an input image acquisition unit 403, a camera information acquisition unit 404, and a detection method setting unit 405. The client CPU 301 further includes a subject detection unit 406, an exposure determination unit 407, a display control unit 408, and a face authentication processing unit 409. The client apparatus 103 may perform the functions of the units 401 to 409 illustrated in FIG. 4 by using hardware (or software) different from the client CPU 301.

The input information acquisition unit 401 receives an input from the user through the input apparatus 104.

The communication control unit 402 performs control to receive, through the network 102, an image transmitted from the monitoring camera 101 (an image captured by monitoring camera 101). Furthermore, the communication control unit 402 performs control to transmit, through the network 102, the control commands issued from the client apparatus 103 to the monitoring camera 101.

The input image acquisition unit 403 acquires the image received from the monitoring camera 101 through the communication control unit 402, as a target image for subject detection processing (an image to which subject detection processing is to be applied). The detail of the detection processing will be described below.

The camera information acquisition unit 404 acquires camera information (imaging information) to be used when the monitoring camera 101 captures an image of a subject, through the communication control unit 402. The camera information (the imaging information) corresponds to various kinds of information to be used when the image of the subject is captured and acquired. The camera information includes an exposure parameter such as an aperture value.

The detection method setting unit 405 sets a predetermined detection method (an appropriate detection method) for the image acquired by the input image acquisition unit 403, among various detection methods including face region detection (face detection) and human body region detection (human body detection). In the face detection, the subject detection unit 406 preferentially detects a face region in the image. In the human body detection, the subject detection unit 406 preferentially detects a human body region in the image. The face region is a region including a face, and the human body region is a region including a human body.

In the present embodiment, the detection method setting unit 405 sets (selects) the face detection or the human body as the detection method. The present embodiment is not limited to such setting. For example, the detection method setting unit 405 may set (select) a detection method that detects a partial characteristic region of a person, such as an upper half body, a head, or a partial face region such as eyes, a nose, or a mouth. Furthermore, the subject to be detected is a person in the present embodiment, but a specific region related to a predetermined subject other than a person may be detected. For example, a predetermined subject preset in the client apparatus 103, such as a face of an animal or an automobile (a vehicle), may be detected.

The exposure determination unit 407 determines an exposure level based on image information about the subject region obtained from the subject detection unit 406, and the communication control unit 402 transmits the determined exposure level to the monitoring camera 101. The monitoring camera 101 then performs exposure control through the communication control unit 207. The detailed processing related to the camera information acquisition unit 404, the detection method setting unit 405, the subject detection unit 406, and the exposure determination unit 407 will be described below with reference to a flowchart in FIG. 5.

The display control unit 408 outputs the captured image in which the exposure correction determined by the exposure determination unit 407 is reflected, to the display apparatus 105 in response to an instruction from the client CPU 301.

The face authentication processing unit 409 performs face authentication processing on the captured image in which the exposure correction determined by the exposure determination unit 407 is reflected, in response to an instruction from the client CPU 301. In the face authentication processing, the captured image is collated with the database in which the preregistered face images and person information are associated with each other, and a piece of person information having a face image similarity that is highest and is a predetermined value or more is output. The similarity can be calculated using feature information matching or a neutral network. In the present embodiment, the subject to be authenticated is the face of a person, but the subject to be authenticated is not limited thereto.

For example, the predetermined subject preset in the client apparatus 103, such as the face of an animal or the number plate of an automobile, may be authenticated. Furthermore, the face authentication processing unit 409 may not necessarily be included in the client apparatus 103. The face authentication processing unit 109 may be included in an apparatus externally connected to the client apparatus through the network 102.

<Subject Detection Processing and Exposure Determination Processing>

Exposure control processing according to the present embodiment will be described with reference to the flowchart in FIG. 5. In the imaging control system 100 illustrated in FIG. 1, it is assumed that the monitoring camera 101, the client apparatus 103, the input apparatus 104, and the display apparatus 105 are turned on, and connection (communication) is established between the monitoring camera 101 and the client apparatus 103. It is also assumed in this state that the capturing of the image of the subject by the monitoring camera 101, the transmission of the image data from the monitoring camera 101 to the client apparatus 103, and the display of the image on the display apparatus 105 are repeated at a predetermined update period. It is further assumed that the processing in the flowchart in FIG. 5 is started by the client CPU 301 in response to input of the captured image of the subject from the monitoring camera 101 to the client apparatus 103 through the network 102.

In step S501, the detection method setting unit 405 sets the face detection in the subject detection unit 406, and the subject detection unit 406 performs face detection processing on the input image.

In step S502, the detection method setting unit 405 sets the human body detection in the subject detection unit 406, and the subject detection unit 406 performs human body detection processing on the input image.

The main storage device 302 of the client apparatus 103 stores, in advance, the patterns corresponding to face characteristic portions and the patterns corresponding to human body characteristic portions. The subject detection unit 406 detects a face region through pattern matching based on the patterns.

Typically, in a case where a face region is detected, a face can be detected with high accuracy, and the face region of the subject and regions other than the face region are clearly distinguishable. However, if conditions such as a direction, a size, and brightness of the face are not suitable for the face detection, the face region cannot be accurately detected. In contrast, in a case where a human body is detected, a region where a person is present can be detected irrespective of the direction, the size, the brightness, and the like of the face. In the human body detection according to the present embodiment, a whole body may not necessarily be detected, and an upper half body, a body part above the chest, or a head region (e.g., a region above shoulders) may be detected.

Figure 7A:
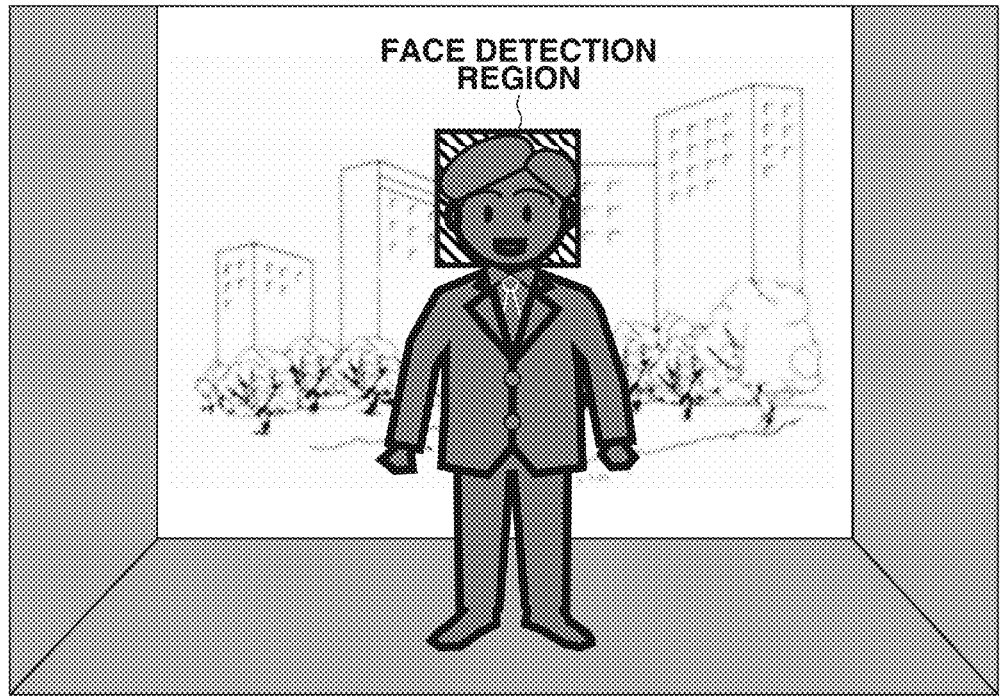
FIGS. 7A and 7B are diagrams illustrating a face detection region and a human body detection region, respectively.
Figure 7B:
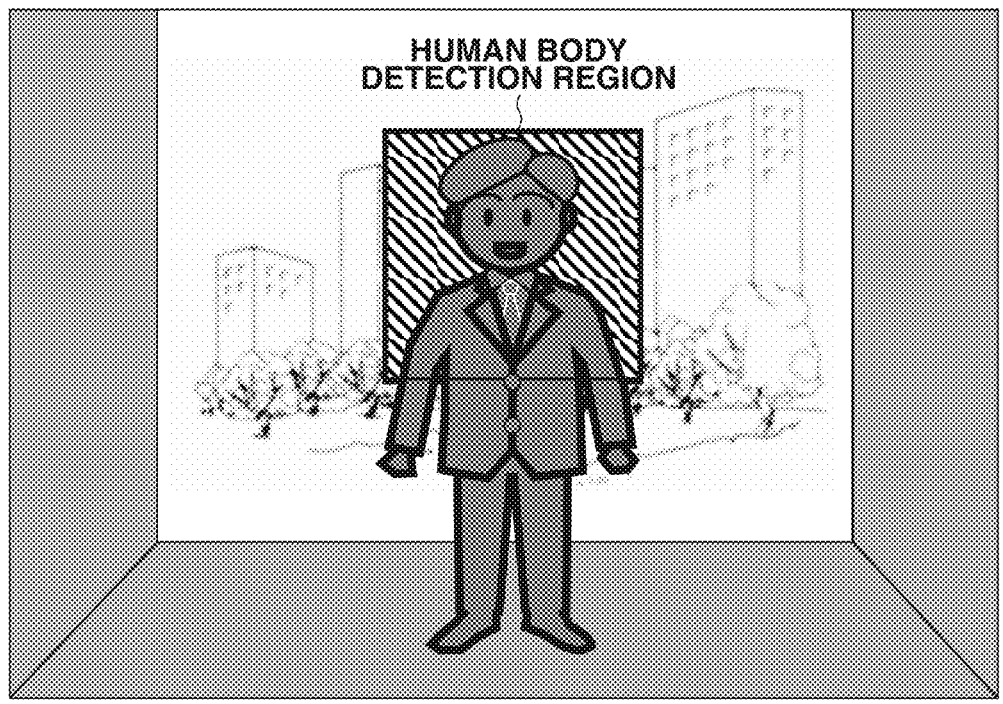

FIG. 7A illustrates a detection example of a face region. FIG. 7B illustrates a detection example of a human body region.

The human body region in FIG. 7B is a partial region of the upper half body (i.e., the body part above the chest). The upper half body includes the face. The human body region is not limited to the region illustrated in FIG. 7B. For example, the human body region may be the whole body of the person or the upper half body. In a case where the face in the image is dark due to backlight or the like, the human body region may be the head region. The head region is the region where the shape of the head can be identified and includes, for example, the shoulders, the neck, and the face. FIGS. 7A and 7B illustrate a case where the monitoring camera 101 is installed at an entrance or a gate of a building such as an office building or a stadium, and the monitoring camera 101 captures an image of a person entering the building from the outside. The building is not limited to the office building and the stadium and may be, for example, a parking lot. In a case where the building is the parking lot, the subject is, for example, a vehicle entering the parking lot. In a case where the vehicle is the subject, the region to be detected is, for example, a vehicle body region (a region including the body of the vehicle and the surroundings) or a number plate region (a region including the number plate of the vehicle and the surroundings).

In a case where a pattern matching method is adopted as the subject detection method, patterns (classifiers) generated using statistical learning may be used as the patterns for pattern matching. Alternatively, the subject may be detected using a method other than the pattern matching method. For example, the subject may be detected by using a luminance gradient in a local region. In other words, the subject detection method is not limited to a specific detection method, and various methods such as a detection method based on machine learning and a detection method based on distance information can be adopted.

In step S503, the face authentication processing unit 409 determines whether a face or a human body has been detected.

In a case where a face or a human body has been detected (YES in step S503), the processing proceeds to step S504. In a case where a face or a human body has not been detected (NO in step S503), the processing ends.

In step S504, the face authentication processing unit 409 performs the face authentication processing. FIG. 6 illustrates the face authentication processing as a subroutine. The face authentication processing will be described now with reference to FIG. 6. The face authentication processing is performed on all faces and human bodies detected by the subject detection unit 406.

As illustrated in FIG. 6, in step S601, the face authentication processing unit 409 acquires a face image, a face ID, and a human body ID from the subject detection unit 406. In a case where a face has not been detected, the face authentication processing unit 409 acquires neither the face image nor the face ID. The face ID is a value generated from the characteristics of the face, and one person has one face ID. This also applies to the human body ID. In other words, the human body ID is a value generated from the characteristics of the human body, and one person has one human body ID.

In step S602, the face authentication processing unit 409 determines whether the face ID or the human body ID has been unauthenticated in the past. The determination is made by referring to the authenticated ID list that holds the past authentication history information. In other words, in step S602, the face authentication processing unit 409 determines whether the detected subject has been previously authenticated. In a case where the face authentication processing unit 409 determines that the detected subject has been unauthenticated in the past (YES in step S602), the processing proceeds to step S603. In a case where the face authentication processing unit 409 determines that the detected subject has been authenticated in the past (NO in step S603), the processing proceeds to step S604.

In step S603, the face authentication processing unit 409 performs the face authentication processing. In the face authentication processing, characteristic information is extracted from the face image, and attribute information, which is associated with characteristic information having the highest similarity with the extracted characteristic information in the database in which preregistered characteristic information and attribute information such as a person's name are associated with each other, is output as a result of the authentication. In a case where the similarity does not reach a predetermined threshold, the authentication is determined to be unsuccessful. Furthermore, in a case where the face image is not acquired, namely, in a case where no face is detected, the authentication is also determined to be unsuccessful.

In step S604, the face authentication processing unit 409 notifies the exposure determination unit 407 that the face or the human body detected by the subject detection unit 406 has been authenticated (by transmitting a signal indicating that the face or the human body has been authenticated). Then the processing ends.

In step S605, the face authentication processing unit 409 determines whether the face authentication has succeeded in step S603. In a case where the face authentication processing unit 409 determines that the face authentication has succeeded (YES in step S605), the processing proceeds to step S606. In a case where the face authentication processing unit 409 determines that the face authentication has not succeeded (NO in step S605), the processing ends.

In step S606, the face authentication processing unit 409 adds the face ID and the human body ID corresponding to the face, to the authenticated ID list indicating that the face has been authenticated. The processing then ends.

The above is the description of the subroutine related to the face authentication processing. Returning now to FIG. 5, the exposure control processing will be described again.

In step S505, a region of interest to be used in step S506 is set. Among the subject face (or faces) and the subject human body (or bodies) about which the authentication notification has not received in step S504, at least one is set as the region of interest. In a case where, among these, a plurality of faces or human bodies is present and a face or a human body set as the region of interest in the processing on a previous frame of the captured image is present, the face or the human body is preferentially set as the region of interest. Otherwise, the region of interest is determined depending on the application purpose based on, for example, the order of detection, the distance from the monitoring camera 101, and the position in the image.

A case where the monitoring camera 101 is installed near an entrance of a building to perform walkthrough authentication will be described as an example. In the walkthrough authentication, a person closer to the monitoring camera 101 passes the monitoring camera 101 faster. Thus, in the case of using the distance from the monitoring camera 101, it is desirable to preferentially perform the exposure control processing on the person close to the monitoring camera 101. In other words, in a case where a plurality of subjects is subjected to the exposure control, the order in which the plurality of subjects is subjected to the exposure control may be determined based on the distance between the monitoring camera (the imaging apparatus) 101 and each of the subjects. In the case of using the position in the image, if the monitoring camera 101 is installed so as to look down on a person, it is considered that a person positioned on a lower side in the image is closer to the monitoring camera 101. Thus, it is desirable to give higher priority to the person. In other words, in a case where a plurality of subjects is subjected to the exposure control, the order in which the plurality of subjects is subjected to the exposure control may be determined based on the position of each of the subjects in the image.

Furthermore, in a case where both the face and the human body of the same subject have been detected, it is desirable to give priority to the face region.

In step S506, the exposure determination unit 407 calculates an average luminance value $I_{object}$ of the region of interest set in step S505. More specifically, information about a position of the region of interest and information about a size of the region of interest are applied to the following expression (1).

$$\bar{I}_{object} = \frac{1}{k \times l} \sum_{i=-k/2}^{k/2} \sum_{j=-l/2}^{l/2} I(v+i, h+j) \quad (1)$$

In the expression (1), I(x, y) represents a luminance value at a two-dimensional coordinate position (x, y) in a horizontal direction (an x-axis direction) and a perpendicular direction (a y-axis direction) in the image. In addition, (v, h) represents a center coordinate of the region of interest, k represents the detected size of the region of interest in the horizontal direction, and l represents the detected size of the region of interest in the perpendicular direction. The left side of the expression (1) represents the average luminance value $I_{object}$ of the region of interest.

In step S507, the exposure determination unit 407 determines an exposure correction value $EV_{correction}$ based on the average luminance value $I_{object}$ calculated in step S506. First, the exposure determination unit 407 calculates a difference ΔDiff between the average luminance value $I_{object}$ of the region of interest calculated in step S506 and a target luminance value $I_{object\ target}$ of the region of interest by using an expression (2). For example, the target luminance value $I_{object\ target}$ of the region of interest may be optionally set by the user, or may be set to a value that increases accuracy considering authentication accuracy in the face authentication.

$$\Delta Diff = I_{object\ target} - \bar{I}_{object} \quad (2)$$

Next, the exposure determination unit 407 determines the exposure correction value $EV_{correction}$ by using an expression (3). A current exposure value $EV_{current}$ is an EV value converted according to the Additive System of Photographic Exposure (APEX) based on a subject luminance value (a brightness value (BV)), and is set based on a program chart that is related to the exposure control and is stored in advance in the client apparatus 103.

$$EV_{correction} = \begin{cases} EV_{current} - \beta & \text{if } \Delta Diff < -Th \\ EV_{current} & \text{if } -Th \leq \Delta Diff \leq Th \\ EV_{current} + \beta & \text{if } Th < \Delta Diff \end{cases} \quad (3)$$

In the expression (3), a parameter β is a coefficient influencing a correction degree (a speed) when exposure is corrected to an underexposure side or an overexposure side with the current exposure value $EV_{current}$ as a center. If the parameter β is set to a large value, the processing speed (the processing time) for the exposure to reach the target value is faster (shorter). However, in a case where erroneous determination occurs in the detection result or in a case where subject detection is unstable, brightness of the entire screen is sharply changed. In contrast, if the parameter β is set to a small value, the processing speed (the processing time) for the exposure to reach the target value is lower (longer), but the processing is robust against erroneous detection and the imaging condition. In a case where the difference ΔDiff falls outside a set threshold Th, the parameter β is set as the exposure correction value for the current exposure value $EV_{current}$.

In step S508, the exposure determination unit 407 communicates with the monitoring camera 101 through the communication control unit 402, and sets the exposure correction value $EV_{correction}$ calculated in step S507 in the monitoring camera 101. The processing then ends.

As described above, in the present embodiment, the face and the human body for which the face authentication is completed by the face authentication processing unit 409 are determined not to be the exposure control targets, and the exposure control is performed on the face and the human body for which the face authentication processing is not completed. Thus, even in a case where a plurality of persons is present in the image, the target persons for the exposure control are sequentially narrowed down based on the face authentication results, so that excellent (efficient) exposure control for the face authentication can be performed. Furthermore, each of the face authentication results is managed in association with not only the face ID but also the human body ID (the identification information). Thus, even in a case where the face cannot be detected due to a change in exposure or face direction, it is possible to avoid repeating the exposure control on the person for whom the face authentication is completed.

Figure 8:
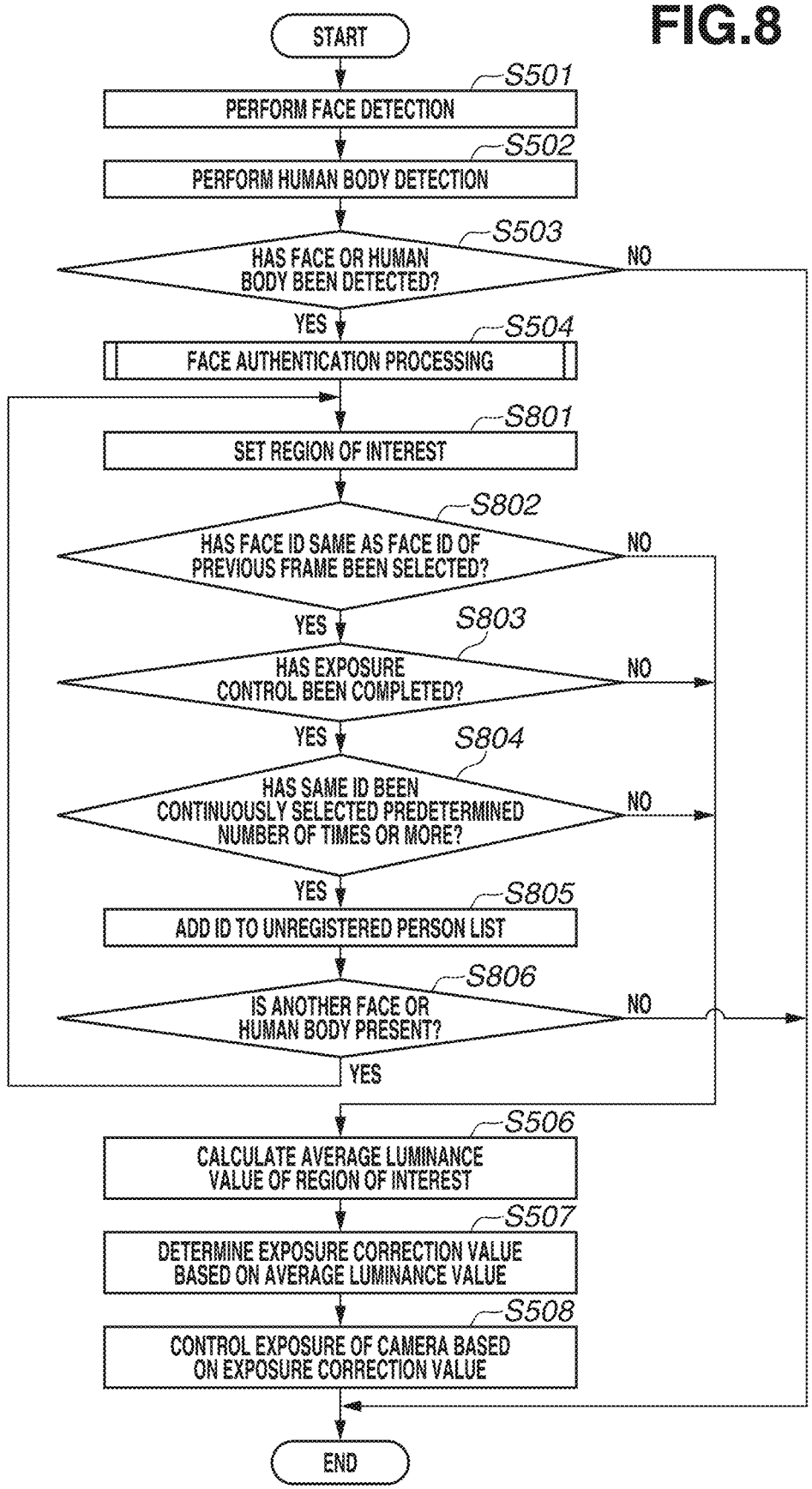
FIG. 8 is a flowchart illustrating exposure control processing according to a second embodiment.

A second embodiment of the present invention will be described next with reference to FIG. 8. In the first embodiment, in a case where a person under the exposure control is not registered in the face authentication database, the exposure control is not performed on another person until the person under the exposure control passes the monitoring camera 101 in some cases. As a result, depending on an installation condition or an application of the monitoring camera 101, the exposure control on another person is delayed, which can affect the face authentication. In the present embodiment, whether the target person (the subject) subjected to the exposure control is unregistered in the database is determined. In a case where the target person is determined to be unregistered in the database, the exposure control on the target person is to be interrupted (the exposure control based on the exposure correction value is not to be performed), so that the exposure control is shifted to the exposure control on another person.

Components and processing similar to those in the first embodiment are denoted by the same reference numerals, and detailed descriptions thereof will be omitted.

Processing in steps S501 to S504 and S506 to S508 are the same as the processing in FIG. 3 (in the first embodiment). The processing proceeds to step S801 after step S504.

In step S801, the exposure determination unit 407 sets the region of interest to be used in step S506 and step S802. In step S801, unlike step S505 according to the first embodiment, an unregistered person list (described below) is referred to, and a subject having an ID present in the unregistered person list is determined not to be the setting target for the region of interest.

Furthermore, in a case where both the face and the human body of the same subject have been detected, the face region is preferentially set as the region of interest.

In step S802, the exposure determination unit 407 determines whether the face ID corresponding to the region of interest set (selected) in step S801 is the same as the face ID of the previous frame. In a case where the face ID is the same as that of the previous frame (YES in step S802), the processing proceeds to step S803. In a case where the face ID is not the same as that of the previous frame (NO in step S802), the processing proceeds to step S506. In a case where the face ID is not present, namely, in a case where the face region is not set as the region of interest, the processing also proceeds to step S506.

In step S803, the exposure determination unit 407 determines whether the exposure control performed in step S508 for the previous frame has reached the target value (the exposure control has been completed). More specifically, the determination is made based on whether the exposure correction value $EV_{correction}$ is equal to the current exposure value $EV_{current}$ in step S507, and whether at least one operation among operations for the aperture of the imaging optical system 201 and the shutter speed and gain of the image sensor 202 has been completed. In a case where the exposure determination unit 407 determines that the exposure control has been completed (YES in step S803), the processing proceeds to step S804. In a case where the exposure determination unit 407 determines that the exposure control has not been completed (NO in step S803), the processing proceeds to step S506.

In step S804, the exposure determination unit 407 determines whether the face ID corresponding to the region of interest set in step S801 has been continuously selected a most recent predetermined number of times or more. The predetermined number of times is set as an interval from completion of the exposure control to completion of the face authentication. In other words, in a case where the face authentication has not been completed the predetermined number of times or more even though the exposure control has been completed (in case where the authentication has not been completed within a predetermined time), the person is determined not to be registered in the face authentication database. In a case where the exposure determination unit 407 determines that the face ID has been continuously selected the predetermined number of times or more (YES in step S804), the processing proceeds to step S805. In a case where the exposure determination unit 407 determines that the face ID has not been continuously selected the predetermined number of times or more (NO in step S804), the processing proceeds to step S506.

In step S805, the exposure determination unit 407 adds (registers) the face ID corresponding to the region of interest set in step S801 and the human body ID corresponding to the face, to the unregistered person list. The unregistered person list is stored in, for example, the auxiliary storage device 303. In other words, the auxiliary storage device 303 registers information (the face ID and the human body ID) about the subject who cannot be authenticated within the predetermined time.

In step S806, the exposure determination unit 407 determines whether another face or another human body is present in the captured image. In a case where the exposure determination unit 407 determines that another face or another human body is present in the captured image (YES in step S806), the processing returns to step S801. In a case where the exposure determination unit 407 determines that another face or another human body is not present in the captured image (NO in step S806), the processing ends.

In the present embodiment, the exposure determination unit 407 determines in step S804 whether the person is unregistered, based on whether the same face ID has been selected the predetermined number of times or more. Alternatively, the determination may be made using other methods. For example, face authentication similarity of the corresponding face ID may be received from the face authentication processing unit 409, and the determination may be made based on whether a state where a value of the face authentication similarity is low is continued. Alternatively, in a case where the face authentication is not completed even though the face direction is detected and the face is substantially directed to a front side, the person may be determined as an unregistered person.

In a case where the person is determined as an unregistered person (in case where the subject is added to unregistered person list), the exposure determination unit 407 may transmit the face image to the face authentication processing unit 409, as a registration image. This is because the exposure control suitable for the face of the person is performed at the time of determination and the face image is suitable as the registration image. Furthermore, the more suitable face image can be transmitted when the face direction is detected and the face is substantially directed to the front side.

In the above-described first and second embodiments, the monitoring camera 101 has been described as an example of the imaging apparatus, but the embodiments of the present invention are applicable to any imaging apparatus other than the monitoring camera. The present invention is not limited to the subjects (or objects) described in the first and second embodiments, but is also applicable to other kinds of subjects (or objects) than those described above. Moreover, the subjects (or objects) described in the first and second embodiments can also be replaced with other subjects (or objects). For instance, the at least one subject (or object) in the second embodiment may be a vehicle. Furthermore, the term "unit" as used in the present disclosure should be construed so as to encompass means configured to carry out the function(s) of the corresponding unit. For instance, the term "communication control unit" encompasses means configured to control communication. The term "unit" can also be replaced by "device". Each unit can also comprise a plurality of subunits.

Other Embodiments

Embodiment(s) of the present invention can also be realized by a computer of a system or apparatus that reads out and executes computer executable instructions (e.g., one or more programs) recorded on a storage medium (which may also be referred to more flirty as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2021-079804, filed May 10, 2021, which is hereby incorporated by reference herein in its entirety.

What is claimed is:

1. A control apparatus for controlling an imaging apparatus, the control apparatus comprising:
   at least one processor; and
   at least one memory in communication with the at least one processor and having stored thereon instructions which, when executed by the at least one processor, cause the control apparatus to:
   perform determination processing to determine whether at least one subject in an image captured by the imaging apparatus is an authenticated subject;
   in a case where it is determined that the at least one subject is an unauthenticated subject, set a region of interest that corresponds to at least a portion of the unauthenticated subject; and
   calculate an average luminance value of the region of interest,
   wherein exposure of the image by targeting the at least one subject is controlled based on the average luminance value of the region of interest,
   wherein when the unauthenticated subject is not registered in a database associated with the imaging apparatus, exposure of the at least one subject is shifted to exposure of another subject that the determination processing has not been performed in the image captured by the imaging apparatus, and
   wherein, in a case where it is determined that the at least one subject is an authenticated subject, the exposure of the image is controlled without targeting the at least one subject.

2. The control apparatus according to claim 1,
   wherein whether subjects of a plurality of subjects in the image are authenticated subjects is determined, and
   wherein the exposure of the image is controlled by targeting at least one subject that is determined to be the unauthenticated subject among the plurality of subjects.

3. The control apparatus according to claim 1, wherein, in a case where it is determined that the at least one subject is the unauthenticated subject, the exposure of the image is controlled based on a luminance of the at least one subject.

4. The control apparatus according to claim 1, wherein the at least one processor executes instructions to detect the at least one subject from the image captured by the imaging apparatus.

5. The control apparatus according to claim 1, wherein the at least one processor executes instructions to authenticate the at least one subject,
   wherein whether the authentication of the at least one subject is completed within a predetermined time is determined, and
   wherein, in a case where it is determined that the authentication of the at least one subject within the predetermined time is not completed, the exposure of the image is controlled without targeting the at least one subject.

6. The control apparatus according to claim 5, wherein the at least one processor executes instructions to, in a case where the authentication of the at least one subject is not completed within the predetermined time, register information about the at least one subject,
   wherein the at least one subject is authenticated based on determining whether the at least one subject is a subject that is registered.

7. The control apparatus according to claim 1, wherein, in a case where it is determined that subjects of a plurality of subjects are unauthenticated subjects, an order is determined in which the subjects in the plurality of subjects are subjected to the exposure control, based on a distance between each subject of the plurality of subjects and the imaging apparatus.

8. The control apparatus according to claim 1, wherein, in a case where it is determined that subjects of a plurality of subjects are unauthenticated subjects, an order is determined in which the subjects of the plurality of subjects are subjected to the exposure control, based on a position of each subject of the plurality of subjects in the image.

9. The control apparatus according to claim 1,
   wherein the at least one subject is a person, and
   wherein the exposure of the image is controlled by targeting a region including at least a part of a human body of the person in the image.

10. The control apparatus according to claim 9,
    wherein the at least one subject is the person, and
    wherein the exposure of the image is controlled by targeting a region including one of an entire body, an upper half body, a body part above the chest, and a head of the person in the image.

11. The control apparatus according to claim 1,
    wherein the at least one subject is a vehicle, and
    wherein the exposure of the image is controlled by targeting a region including a vehicle body of the vehicle in the image or a region including a number plate of the vehicle in the image.

12. A method for controlling an imaging apparatus, the method comprising:
    performing determination processing for determining whether at least one subject in an image captured by the imaging apparatus is an authenticated subject;
    in a case where the at least one subject is determined to be an unauthenticated subject, setting a region of interest that corresponds to at least a portion of the unauthenticated subject;
    calculating an average luminance value of the region of interest; and
    controlling exposure of the image by targeting the at least one subject based on the average luminance value of the region of interest,
    wherein when the unauthenticated subject is not registered in a database associated with the imaging apparatus, exposure of the at least one subject is shifted to exposure of another subject that the determination processing has not been performed in the image captured by the imaging apparatus, and wherein, in a case where it is determined that the at least one subject is an authenticated subject, the exposure of the image is controlled without targeting the at least one subject.

13. The method according to claim 12, further comprising:
    determining whether subjects of a plurality of subjects in the image are authenticated subjects; and
    controlling the exposure of the image by targeting at least one subject that is determined not to be an authenticated subject among the plurality of subjects.

14. A non-transitory computer-readable storage medium storing a program for causing a computer to execute a method for controlling an imaging apparatus, the method comprising:
    performing determination processing for determining whether at least one subject in an image captured by the imaging apparatus is an authenticated subject;
    in a case where the at least one subject is determined to be an unauthenticated subject, setting a region of interest that corresponds to at least a portion of the unauthenticated subject;
    calculating an average luminance value of the region of interest; and
    controlling exposure of the image by targeting the at least one subject based on the average luminance value of the region of interest,
    wherein when the unauthenticated subject is not registered in a database associated with the imaging apparatus, exposure of the at least one subject is shifted to exposure of another subject that has not been performed the determination processing in the image captured by the imaging apparatus, and
    wherein, in a case where it is determined that the at least one subject is an authenticated subject, the exposure of the image is controlled without targeting the at least one subject.

15. The storage medium according to claim 14, further comprising:
    determining whether subjects of a plurality of subjects in the image are authenticated subjects; and
    controlling the exposure of the image by targeting at least one subject that is determined not to be an authenticated subject among the plurality of subjects.

* * * * *